Figure 1:
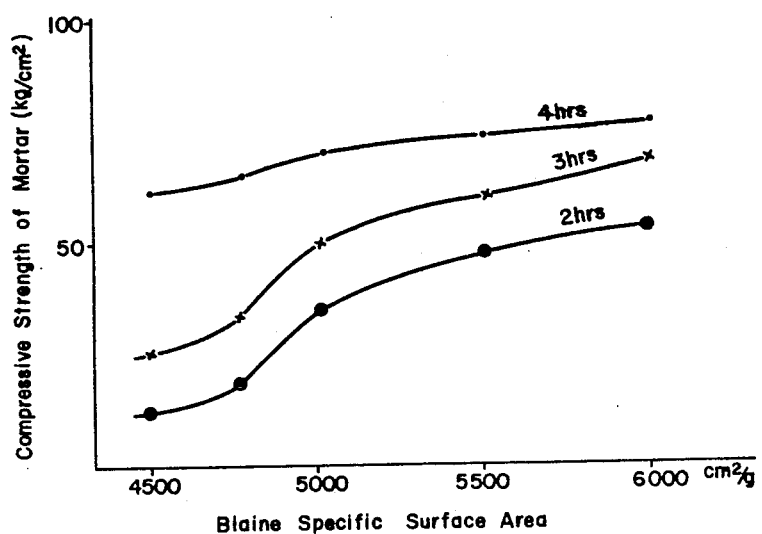

United States Patent [19]

Uchikawa et al.

[11] 3,819,389

[45] June 25, 1974

[54] PROCESS FOR MANUFACTURING A RAPID HARDENING PORTLAND CEMENT

[75] Inventors: Hiroshi Uchikawa; Noboru Kasai, both of Tokyo, Japan

[73] Assignee: Onoda Cement Co., Ltd., Onoda-shi, Yamaguchi, Japan

[22] Filed: Nov. 27, 1972

[21] Appl. No.: 309,805

[30] Foreign Application Priority Data
Nov. 26, 1971 Japan.............................. 46-94440

[52] U.S. Cl.................... 106/100, 106/89, 106/104, 106/315
[51] Int. Cl............................................. C04b 7/02
[58] Field of Search ............ 106/314, 315, 89, 100, 106/104

[56] References Cited
UNITED STATES PATENTS 3,615,787   10/1971   Teramoto et al. .................. 106/100
3,628,973   12/1971   Greening et al. .................. 106/100

*Primary Examiner*—James E. Poer
*Attorney, Agent, or Firm*—Oblon, Fisher, Spivak, McClelland & Maier

[57] ABSTRACT

This invention relates to a process for manufacturing a modified rapid hardening portland cement of which a setting time is convenient even at low temperature, which comprises mixing calcium carbonate, sodium carbonate, potassium carbonate and/or magnesium carbonate, or a mixture of said carbonate and sodium sulfate, potassium sulfate, aluminium sulfate and/or magnesium sulfate with a clinker which mainly consists of a calcium halo-aluminate having the formula $11CaO \cdot 7Al_2O_3 \cdot CaX_2$, intergrinding the mixture and then mixing finely powdered anhydrite with the ground mixture to manufacture cement in an amount such that the weight ratio of $Al_2O_3/SO_3$ in the cement is 0.6–1.8.

15 Claims, 2 Drawing Figures

PROCESS FOR MANUFACTURING A RAPID HARDENING PORTLAND CEMENT

This invention relates to a process for manufacturing extremely rapid hardening portland cement from clinker containing, as main minerals, calcium haloaluminate having the formula $11CaO_7Al_2O_3 \cdot CaX_2$ (hereinafter abridged to $C_{11}A_7 \cdot CaX_2$, wherein X is a halogen), $3CaO \cdot SiO_2$ solid solution (hereinafter abridged to $C_3S$), $2CaO \cdot SiO_2$ solid solution (hereinafter abridged to $C_2S$) and $2CaO \cdot Fe_2O_3 - 6CaO \cdot 2Al_2O_3 \cdot Fe_2O_3$ (hereinafter abridged to $C_4AF$) ferrous solid solution.

A clinker comprising, as hydraulic minerals, $C_{11}A_7 \cdot CaX_2$ and at least one of $C_3S$, $C_2S$ and $C_4AF$, etc. is produced by burning raw mixtures of silicious material, aluminous material, calcareous material and a small amount of halogen compound such as fluorite or calcium chloride. As the clinker contains extremely active hydraulic mineral of $C_{11}A_7 \cdot CaX_2$, the hydration of only this clinker powder is too fast to develop considerable high strength both in initial and later ages. Then it has been discovered that when anhydrite (or anhydrite gypsum) and/or hemihydrate (or hemihydrate gypsum) or gypsum and one or more of sulfate, nitrate and chloride of potassium, sodium, magnesium, calcium, aluminum, and ammonium(excluding gypsum), sugar, sodium hydrogen carbonate, water soluble phosphate, aliphatic carbonic acid, silicofluoride, sodium silicate, lignin sulfonate, higher alcohol ester of sulfuric acid and alkyl-sulfonate was added to the clinker, setting time of cement thus obtained is retarded considerably and mortar strength of the cement was improved in the early and the later stages than that of the former cement.

However, a cement thus produced has such characteristics as shown in the following results (Tables 1 and 2), that at the temperatures above 20°C, an initial setting time is convenient and strength of mortar develops desirably in the early and the later stages but below 20°C, a setting time is extremely slow and does not develop in the early age or does not develop at all in the later ages.

Then, the content of anhydrite and additives in cements which are prepared experimentally under the process for manufacturing as mentioned above is shown in Table 1. Table 2-1 and Table 2-2 show setting time and compressive strength of mortar of these cements.

Table 1

| Sample No. | Ratio (wt.%) Clinker | Anhydrite | Additives | | Blaine Specific Surface Area of Cement cm²/g |
|---|---|---|---|---|---|
| 1 | 85.0 | 14.0 | Hemihydrate | 1.0 | 5480 |
| 2 | 85.0 | 12.0 | Hemihydrate | 3.0 | 5530 |
| 3 | 85.0 | 14.0 | Anhydrite | 1.0 | 5410 |
| 4 | 85.0 | 12.0 | Anhydrite | 3.0 | 5600 |
| 5 | 85.0 | 14.0 | Hemihydrate | 1.0 | 4400 |
| 6 | 85.0 | 12.0 | Hemihydrate | 3.0 | 5660 |
| 7 | 85.0 | 14.0 | Anhydrite | 1.0 | 5370 |
| 8 | 85.0 | 12.0 | Anhydrite | 3.0 | 5420 |
| 9 | 80.0 | 13.0 | Lime stone | 7.0 | 5450 |
| 10 | 82.45 | 14.55 | Lime stone | 2.0 | 5420 |
| 11 | | | Anhydrous sodium sulfate | 1.0 | |
| 11 | 85.0 | 15.0 | — | | 5350 |
| 12 | 80.6 | 14.0 | Lime stone Anhydrous sodium sulfate | 4.4 1.0 | 5480 |

Note: Sample cements are prepared in the following way:
- No.1–2: Hemihydrate of 5200 cm²/g(Blaine) and anhydrite of 8000 cm²/g(Blaine) are added to powdered clinker.
- No.3–4: Anhydrite of 14,500 cm²/g(Blaine) and anhydrite of 8000 cm²/g(Blaine) are added to powdered clinker.
- No.5–8: Anhydrite of 8000 cm²/g(Blaine) is added to a interground mixture of hemihydrate or anhydrite and clinker.
- No.9–10: Anhydrite and lime stone or lime stone and anhydrous sodium sulfate are added to clinker and interground.
- No.11–12: Separately ground anhydrite, lime stone and anhydrous sodium sulfate are mixed.

Table 2-1

| | Test Temperature 5°C | | | | | | | Test Temperature 10°C | | | | | | |
|---|---|---|---|---|---|---|---|---|---|---|---|---|---|---|
| Sample No. | Setting Time (Kg/cm²) Initial-Final (min) | Compressive Strength of Mortar | | | | | | Setting Time Initial-Final (min) | Compressive Strength of Mortar | | | | | |
| | | 2 hrs | 3 hrs | 6 hrs | 1 day | 3 days | 28 days | | 2 hrs | 3 hrs | 6 hrs | 1 day | 3 days | 28 days |
| 1 | — | — | — | — | 11 | 75 | 204 | 41–62 | — | 41 | 80 | 170 | 256 | 294 |
| 2 | — | — | — | — | — | 21 | 195 | 190–330 | — | — | — | 11 | 86 | 262 |
| 3 | — | — | — | — | — | 48 | 190 | 49–71 | — | 22 | 81 | 144 | 202 | 303 |

Table 2-1 — Continued

| | Test Temperature 5°C | | | | | | | Test Temperature 10°C | | | | | | |
|---|---|---|---|---|---|---|---|---|---|---|---|---|---|---|
| | Setting Time Initial-Final (min) | Compressive Strength of Mortar (Kg/cm²) | | | | | | Setting Time Initial-Final (min) | Compressive Strength of Mortar | | | | | |
| Sample No. | | 2 hrs | 3 hrs | 6 hrs | 1 day | 3 days | 28 days | | 2 hrs | 3 hrs | 6 hrs | 1 day | 3 days | 28 days |
| 4 | — | — | — | — | — | — | — | 220–340 | — | — | — | 8 | 70 | 295 |
| 5 | — | — | — | — | — | 56 | 208 | 68–97 | — | 28 | 69 | 186 | 250 | 321 |
| 6 | — | — | — | — | — | — | — | 235–390 | — | — | — | — | 44 | 202 |
| 7 | — | — | — | — | — | 77 | 202 | 58–70 | — | 20 | 77 | 167 | 210 | 306 |
| 8 | — | — | — | — | — | — | — | 191–200 | — | — | — | 19 | 120 | 291 |
| 9 | — | — | — | — | — | — | 181 | — | — | — | — | — | 11 | 105 |
| 10 | — | — | — | — | — | 61 | 226 | — | — | — | — | — | 14 | 102 |
| 11 | — | — | — | — | 25 | 80 | 250 | 40–59 | — | 45 | 92 | 180 | 268 | 303 |
| 12 | — | — | — | — | 10 | 90 | 309 | 60–72 | — | 31 | 85 | 202 | 278 | 348 |

Table 2-2

| | Test Temperature 20°C | | | | | | Test Temperature 30°C | | | | | |
|---|---|---|---|---|---|---|---|---|---|---|---|---|
| Sample No. | Setting Time initial-final (min) | Compressive Strength of Mortar (kg/cm²) | | | | | Setting Time Initial-Final (min) | Compressive Strength of mortar (kg/cm²) | | | | |
| | | 2 hrs | 3 hrs | 1 day | 3 days | 28 days | | 2 hrs | 3 hrs | 1 day | 3 days | 28 days |
| 1 | 13–20 | 60 | 94 | 206 | 259 | 413 | 21–29 | 69 | 114 | 221 | 321 | 424 |
| 2 | 27–37 | 48 | 92 | 201 | 261 | 422 | 26–34 | 71 | 118 | 223 | 330 | 435 |
| 3 | 16–21 | 49 | 71 | 189 | 223 | 398 | 20–29 | 68 | 121 | 203 | 310 | 411 |
| 4 | 25–33 | 32 | 102 | 212 | 243 | 412 | 27–39 | 59 | 114 | 214 | 309 | 433 |
| 5 | 23–32 | 80 | 98 | 196 | 240 | 421 | 24–29 | 59 | 118 | 218 | 311 | 430 |
| 6 | 29–40 | 79 | 110 | 219 | 276 | 419 | 27–38 | 48 | 106 | 221 | 302 | 428 |
| 7 | 19–29 | 78 | 102 | 202 | 254 | 407 | 23–31 | 64 | 124 | 216 | 314 | 426 |
| 8 | 26–35 | 69 | 104 | 227 | 277 | 426 | 29–41 | 71 | 119 | 208 | 309 | 414 |
| 9 | 29–41 | 68 | 102 | 229 | 312 | 459 | 27–33 | 59 | 116 | 228 | 359 | 478 |
| 10 | 34–40 | 72 | 112 | 214 | 294 | 428 | 28–36 | 68 | 111 | 214 | 312 | 431 |
| 11 | 26–32 | 65 | 98 | 209 | 261 | 412 | 23–30 | 64 | 112 | 210 | 330 | 420 |
| 12 | 30–41 | 58 | 100 | 206 | 271 | 439 | 29–37 | 55 | 114 | 209 | 352 | 448 |

Note. For the test temperature of 30°C, citric acid in the amount of 0.2% by weight of cement was added to all the samples as retarder.

Table 1 and 2 showed that a setting time of these cements was convenient and strength of mortars developed considerably both at 20° and 30°C, however, at the lower temperatures of 5° and 10°C, a setting time was extremely lengthened and early age strength of mortars were low or did not develop and in later ages strength of mortars did not develop sufficiently too. It was further observed that this characteristics was not improved, as shown in the samples No. 1–8, by decreasing an amount of hemihydrate or anhydrite added as a retarder or, as shown in samples No. 11, in the absence thereof.

An object of this invention is to provide a process for manufacturing a modified extremely rapid hardening portland cement whose mortar setting time is convenient even at low temperature and its compressive strength in early and later ages develops sufficiently through a wide range of temperature from low to high.

Further and additional objects of this invention will appear from the following description and the appended claims.

In accordance with one embodiment of this invention, a modified portland cement is prepared by the process in which a mixture of a carbonate of calcium, sodium, potassium or magnesium, or a mixture of said carbonate and a sulfate of sodium, potassium, aluminium or magnesium and clinker containing $C_{11}A_7 \cdot CaX_2$ is interground and then anhydrite powder is added to the resulting mixture powder.

Figure 2:
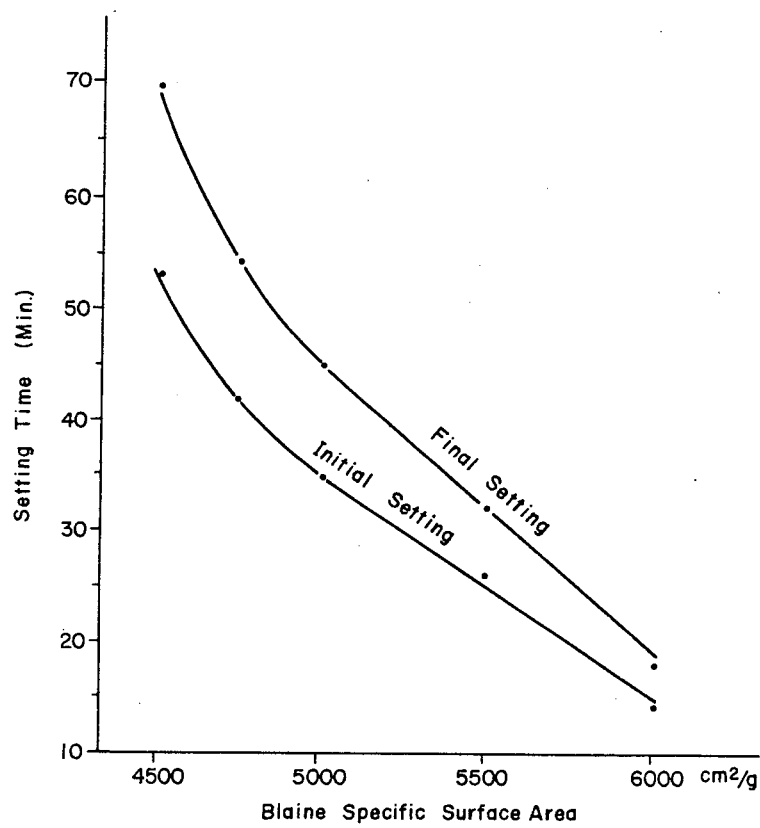

This invention can be more fully understood from the following detailed description when taken in conjunction with reference to the accompanying drawings, in which:

FIG. 1 and FIG. 2 show the relation between fineness of cement prepared by this invention, and a setting time and compressive strength of mortar prepared from the cement.

The results of experiments conducted by using the clinker of the same composition as the above test($C_{11}A_7 \cdot CaF_2$—24 percent, $C_3S$—49 percent) are shown in Tables 3-4.

Table 3

| Sample No. | Mixing Ratio (wt. %) | | | | Blaine Specific Surface Are Of Cement (cm²/g) |
|---|---|---|---|---|---|
| | Clinker | Anhydrite | Additives | | |
| 1 | 80.0 | 15.0 | Calcium carbonate | 5.0 | 5520 |
| 2 | 80.6 | 15.0 | Lime stone | 4.4 | 5410 |
| 3 | 80.6 | 14.0 | Lime stone | 4.4 | 5590 |
| | | | Anhydrous sodium sulfate | 1.0 | |
| 4 | 81.0 | 15.0 | Calcium carbonate | 4.0 | 5470 |

Table 4-1

| | Test Temperature 5°C | | | | | | | Test Temperature 10°C | | | | | | |
|---|---|---|---|---|---|---|---|---|---|---|---|---|---|---|
| | Setting Time Initial- | Compressive Strength of Mortar (kg/cm²) | | | | | | Setting Time Initial- | Compressive Strength of Mortar (kg/cm²) | | | | | |
| Sample No. | Final (min) | 2 hrs | 3 hrs | 6 hrs | 1 day | 3 days | 28 days | Final (min) | 2 hrs | 3 hrs | 6 hrs | 1 day | 3 days | 28 days |
| 1 | 60–71 | 35 | 77 | 144 | 240 | 309 | 432 | 35–44 | 42 | 112 | 164 | 240 | 321 | 442 |
| 2 | 59–69 | 34 | 80 | 152 | 258 | 325 | 455 | 31–39 | 49 | 110 | 177 | 248 | 335 | 439 |
| 3 | 58–75 | 39 | 89 | 153 | 260 | 330 | 561 | 32–39 | 51 | 112 | 186 | 259 | 339 | 462 |
| 4 | 60–72 | 30 | 71 | 149 | 251 | 307 | 437 | 33–42 | 42 | 109 | 166 | 255 | 330 | 458 |

Table 4-2

| | Test Temperature 20°C | | | | | | Test Temperature 30°C | | | | | |
|---|---|---|---|---|---|---|---|---|---|---|---|---|
| | Setting Time initial-final | Compressive Strength of Mortar (kg/cm²) | | | | | Setting Time initial-final | Compressive Strength of Mortar (kg/cm²) | | | | |
| Sample No. | (min) | 2 hrs | 3 hrs | 1 day | 3 days | 28 days | (min) | 2 hrs | 3 hrs | 1 day | 3 days | 28 days |
| 1 | 21–29 | 78 | 115 | 230 | 319 | 458 | 26–35 | 78 | 132 | 221 | 369 | 459 |
| 2 | 23–35 | 83 | 120 | 232 | 312 | 462 | 27–34 | 90 | 144 | 225 | 352 | 468 |
| 3 | 24–32 | 95 | 124 | 242 | 320 | 470 | 25–33 | 92 | 145 | 232 | 390 | 494 |
| 4 | 23–32 | 86 | 121 | 238 | 315 | 466 | 26–33 | 91 | 136 | 221 | 378 | 482 |

Note: For the test temperature of 20°C, citric acid in the amount of 0.1% by weight of cement was added to all the samples as retarder.

From the results shown in Tables 3–4, it was observed that the cement prepared by this invention showed a high early set strength both at 10° and 5°C and that at the temperatures of 20° and 30°C, addition of a retarder gave a normal setting time and initial strength. It is also observed that the cement prepared by this invention develops far higher compressive strength by the end of 3 days compared to the prior experiments at the temperature range of 5°–30°C and to the cement prepared by adding lime and anhydrous sodium sulfate ground separately as shown in sample No. 12 of Tables 1–2.

The reason why the cement of this invention develops an excellent early strength at low temperatures and later stage strength increases remarkably is supposed to be the followings. When clinker is mixed with additives consisting of carbonate or carbonate and sulfate and interground, not only particle distribution of ground clinker particles is adjusted within a narrow range by the presence of additives and clinker particle and additives are mixed homogeneously in the ground material. As a result, when hydration test is executed on the cement prepared by mixing to the above ground material powdered anhydrite, velocity of dissolution of clinker into liquid phase increases even at low temperatures as at room temperature, making the velocity of dissolution into liquid phase of clinker and anhydrite adequate to produce hydration minerals, calcium sulfoaluminate for example, and the hydration is speeded.

In sample Nos. 9–10 in Tables 1–2, mixture of clinker and anhydrite or clinker, lime and anhydrous sodium sulfate is ground, however, as anhydrite is overground selectively in this case, when hydration is tested on the cement thus prepared, it is supposed that velocity of anhydrite into liquid phase at low temperatures becomes extremely faster than that of clinker and slows down hydration.

Experimental results are explained hereunder on relation between fineness of cement prepared by this invention and a setting time and compressive strength. Chemical and mineral composition of clinker and chemical composition of gypsum both used in the experiments are as shown in Tables 5 and 6.

Table 5

| Chemical Composition (wt. %) | | | | | | | Mineral Composition (wt. %) | | |
|---|---|---|---|---|---|---|---|---|---|
| $SiO_2$ | $Al_2O_3$ | $Fe_2O_3$ | CaO | $SO_3$ | F | Total | $C_{11}A_7 \cdot CaF_2$ | $C_3S$ | |
| 17.0 | 14.1 | 2.5 | 62.3 | 1.0 | 1.2 | 98.1 | 25 | 51 | |

Table 6

| ig. loss % | $SiO_2+R_2O_3$ % | CaO % | $SO_3$ % | Total |
|---|---|---|---|---|
| 21.1 | 1.9 | 31.8 | 44.8 | 99.6 |

The anhydrite used in this test is prepared by burning gypsum of chemical composition as in Table 6 at the temperature of 950°C in an electric furnace for 1 hour and is 8,000 cm²/g (Blaine)

The test was performed on cement prepared by intergrinding the said clinker, line (purity 98 percent) and anhydrous sodium sulfate in the proportion of 94:5:1 by weight into various fineness and then adding the said powdered anhydrite to the resulting mixture in such amount as $Al_2O_3/SO_3$ weight ratio in cement thus produced is 1.0 and a compressive strength of mortar at temperature of 10°C was measured (according to JIS R 5201 testing method, which is also applied to the compressive strength tests hereunder) and setting time of mortar (cement:standard sand=1:2, water/cement ratio 0.55, the determination of initial and final setting of cement is based on JIS R 5201 testing method for paste setting, which is applied for the tests hereunder).

FIGS. 1 and 2 showed that at the mixing temperature of 10°C, above 5,000 cm²/g (Blaine) gave suddenly rapid setting and high early set strength. The reason would be that at Blaine specific surface area of clinker powder below 5,000 cm²/g, lime being ground selectively than clinker, even when the fineness of ground material is below 5,000 cm²/g, fineness of clinker is small and therefore velocity of dissolution of clinker into liquid phase is far slower than that of anhydrite and as a result development of early and later strength are retarded, while when Blaine specific surface area of clinker powder is above 5,000 cm²/g, as fineness of clinker also becomes large, velocity of dissolution of clinker comes to balance with that of anhydrite so as to be adequate to produce hydration minerals and thus early and later strength develop satisfactorily.

This invention relates to a process for manufacturing a rapid hardening portland cement from clinker comprising a calcium halo-aluminate having the formula $C_{11}A_7 \cdot CaX_2$ and at least one selected from the group consisting of $C_3S$, $C_2S$ and $C_4AF$, which comprises adding an additive consisting of at least one carbonate of calcium, sodium, potassium and magnesium, or a mixture of said carbonate and at least one sulfate of sodium, potassium, aluminium, and then adding finely powdered anhydrite to the ground mixture in an amount such that the weight ratio of $Al_2O_3/SO_3$ in cement thus prepared is 0.6–1.8.

This invention is applied to the clinker containing 5–60 percent of $C_{11}A_7 \cdot CaX_2$ and the fineness of the interground mixture of clinker and additives is suitably in the range of 2,500–8,500 cm²/g (Blaine), preferably 4,000–6,500 cm²/g (Blaine). It is preferable to use anhydrite prepared by burning gypsum at around 950°C and its fineness is suitably in the range of 2,500–15,000 cm²/g (Blaine), preferably in the range of 5,000–10,000 cm²/g (Blaine) and it is also preferable, in the event the fineness of interground clinker and additives is low, to mix anhydrite of low fineness, and it is further preferable the lower the temperature at which cement hardens, the finer the cement is. For example, when cement is prepared by mixing clinker, lime and anhydrous sodium sulfate in the weight proportion of 95:4:1, intergrinding and then adding anhydrite prepared by burning by-product gypsum prepared from wet-process phosphoric acid at 950°C, anhydrite of 8,000 cm²/g (Blaine) is to be added when the fineness of the ground mixture is 5,000 cm²/g, and above 8,000 cm²/g (Blaine) anhydrite when the ground mixture is above 5,000 cm²/g (Blaine).

In this invention, the amount of carbonate of calcium, potassium and/or magnesium, etc. to be added to clinker is in the range of 1–15 percent by weight to clinker and that of sulfate of sodium, potassium, aluminium and/or magnesium is 0.1–7 percent by weight based on $SO_3$. Additives below the lower limit of the above figure has no effect and that above the upper limit is not preferable because the strength of cement is decreased.

Within the range of the above figure, the set strength increases as the amount of additives is increased but it is preferable to adjust the amount of additives according to $C_{11}A_7 \cdot CaX_2$ content in clinker.

On carrying out this invention, anhydrite powder may be incorporated to the ground clinker in either of the following ways. In one method, anhydrite is separately ground to a certain fineness and mixed with the powder of mixture of clinker and a carbonate or clinker, a carbonate and a sulfate interground to the certain fineness in a mill. In another method, round grains of anhydrite is added to a mill before the mixture powder of clinker and a carbonate or clinker, a carbonate and a sulfate is ground to a certain fineness so that the interground clinker mixture and anhydrite reaches to a desired fineness at mill outlet.

It is also possible to hasten grinding by using the same grinding aid as is used in grinding conventional portland cement clinker.

It is further possible to produce cement which hardens at low temperatures by intergrinding a mixture of conventional portland cement clinker and the clinker used in this invention and then mixing anhydrite thereto.

According to this invention, controlled setting time and high early strength development which has been unattainable hitherto can be obtained through a wide range of temperature from low to high (using at high temperatures, retarder such as citric acid should be added) and strength in later stage is greatly improved and mortar and concrete with excellent workability can be manufactured from the cement.

EXAMPLE 1

Mixture of red boxite, clay, quick lime, fluorite and a small amount of gypsum were ground, mixed and shaped under pressure and burnt at the temperature of 1,260°–1,350°C so as to make a clinker which chemical and mineral composition are as shown in Table 7.

Table 7

| Chemical Composition (wt. %) | | | | | | Mineral Composition (wt. %) | |
|---|---|---|---|---|---|---|---|
| $SiO_2$ | $Al_2O_3$ | $Fe_2O_3$ | CaO | F | Total | $C_{11}A_7 \cdot CaF_2$ | $C_3S$ |
| 17.2 | 13.5 | 2.1 | 63.4 | 1.2 | 97.4 | 23 | 56 |

Anhydrite was prepared by burning by-product gypsum prepared from wet-process phosphoric acid at 920°C in a rotary kiln and then ground to a fineness of 8,230 cm²/g Blaine specifice surface area. The chemical composition of by-product gypsum is shown in Table 8.

Table 8

| ig. loss % | $SiO_2+R_2O_3$% | CaO% | $SO_3$% | $P_2O_5$% | Total% |
|---|---|---|---|---|---|
| 20.8 | 2.7 | 34.4 | 41.1 | 0.32 | 99.3 |

Various cements were prepared by mixing to the clinker dolomite, lime and lime and anhydrous sodium sulfate in the proportion as shown in Table 9, grinding the resulting mixture to the fineness as shown in Table 9 in an open circuit three chamber mill of 2m in diameter and 14m in length and then mixing gypsum anhydrite prepared as described above in the proportion as shown in Table 9. Setting time and compressive strength of mortar at various temperatures were measured on the cement produced as above and results are shown in Table 9. For comparison, Table 9 includes a test result on a cement prepared by the method shown in Table 1, No. 3–4.

position as Table 11 and magnesium carbonate or lime and anhydrous sodium sulfate were mixed, ground in the same mill as used in Example 1 to the fineness as shown in Table 12 and added to the resulting mixture with anhydrite prepared from gypsum of the same composition as in Table 8 in the proportion as shown in

TABLE 9

| No. | Method | Mixing ratio of cement (wt. percent) | | | Anhydrite added after grinding clinker | Blaine specific surface area of interground materials | Setting temperature of mortar | Setting time of mortar, initial-final | Compressive strength of mortar (kg./cm.$^2$) | | | | | |
|---|---|---|---|---|---|---|---|---|---|---|---|---|---|---|
| | | Interground materials | | | | | | | 2 hrs. | 3 hrs. | 6 hrs. | 1 day | 3 days | 28 days |
| | | Clinker | Additives | | | | | | | | | | | |
| 1 | (¹) | 80.6 | Dolomite, 4.4 | | 15 | 5,130 | 5 | 60–71 | 38 | 71 | 152 | 229 | 306 | 448 |
| | | | | | | | 10 | 37–44 | 40 | 103 | 166 | 248 | 328 | 452 |
| | | | | | | | 20 | 23–31 | 78 | 121 | 188 | 221 | 304 | 465 |
| | | | | | | | 30 | 24–29 | 81 | 131 | 195 | 222 | 368 | 471 |
| 2 | (¹) | 80.6 | Limestone, 4.4 | | 15 | 5,070 | 5 | 56–67 | 40 | 80 | 161 | 255 | 331 | 470 |
| | | | | | | | 10 | 30–39 | 51 | 118 | 171 | 258 | 341 | 480 |
| | | | | | | | 20 | 23–30 | 89 | 121 | 198 | 231 | 312 | 488 |
| | | | | | | | 30 | 25–30 | 90 | 133 | 201 | 242 | 382 | 490 |
| 3 | (¹) | 80.6 | {Limestone, 4.4; Anhydrous sodium sulfate, 1.0} | | 14 | 5,110 | 5 | 60–72 | 37 | 90 | 160 | 260 | 335 | 468 |
| | | | | | | | 10 | 32–42 | 49 | 110 | 188 | 260 | 338 | 460 |
| | | | | | | | 20 | 26–32 | 90 | 128 | 192 | 244 | 320 | 471 |
| | | | | | | | 30 | 23–30 | 93 | 141 | 200 | 238 | 390 | 497 |
| 4 | (²) | None | | | 15 | 5,020 | 5 | | | | | 30 | 99 | 281 |
| | | | | | | | 10 | 45–60 | | 38 | 90 | 195 | 282 | 401 |
| | | | | | | | 20 | 23–42 | 60 | 90 | 152 | 206 | 251 | 408 |
| | | | | | | | 30 | 26–38 | 71 | 110 | 105 | 220 | 312 | 412 |

¹ Method of this invention.
² Method shown in Table 1, No. 3–4.

NOTE.—For test temperature of 20 and 30° C. in Nos. 1–3, 0.75% and 1.5% of citric acid was added respectively as retarder melted in mixing water. For 20 and 30° C. in No. 4, citric acid in the amount of 1.0% and 2.0% of cement was added respectively as retarder.

EXAMPLE 2

Cement clinker of the composition as shown in Table 10 prepared by using the same materials as in Example 1, rapid hardening portland cement clinker of the composition as Table 11 and magnesium carbonate or lime and anhydrous sodium sulfate were mixed, ground in the same mill as used in Example 1 to the fineness as shown in Table 12 and added to the resulting mixture with anhydrite prepared from gypsum of the same composition as in Table 8 in the proportion as shown in Table 12. Measurement was made on the cement prepared as above on setting time and compressive strength at various temperatures.

Table 10

| Chemical Composition (wt.%) | | | | | | Mineral Composition (wt. %) | |
|---|---|---|---|---|---|---|---|
| SiO$_2$ | Al$_2$O$_3$ | Fe$_2$O$_3$ | CaO | F | Total | C$_{11}$A$_7$·CaF$_2$ | C$_3$S |
| 11.2 | 23.9 | 2.9 | 57.9 | 1.8 | 97.7 | 43 | 31 |

Table 11

| SiO$_2$% | Al$_2$O$_3$% | Fe$_2$O$_3$% | CaO% | MgO% | Total% |
|---|---|---|---|---|---|
| 21.8 | 5.4 | 2.5 | 67.0 | 1.5 | 98.2 |

TABLE 12

| | Mixing ratio (wt. percent) | | | | Fineness of interground material cm.$^2$/g. (Blaine) | Setting temperature of mortar | Setting time of mortar initial-final (min.) | Compressive strength of mortar (kg./cm.$^2$) | | | | | |
|---|---|---|---|---|---|---|---|---|---|---|---|---|---|
| | Interground Materials | | | Anhydrite | | | | 2 hrs. | 3 hrs. | 6 hrs. | 1 day | 3 days | 28 days |
| | Rapid hardening clinker | Clinker containing C$_{11}$A$_7$·CaF$_2$ | Additive | | | | | | | | | | |
| 1 | 39.6 | 40.0 | Magnesium carbonate, 4.4 | 16 | 5,210 | 5 | 75–90 | 14 | 48 | 82 | 225 | 330 | 462 |
| | | | | | | 10 | 42–52 | 20 | 51 | 95 | 235 | 321 | 470 |
| | | | | | | 20 | 33–40 | 44 | 85 | 142 | 225 | 331 | 472 |
| | | | | | | 30 | 20–28 | 48 | 86 | 155 | 254 | 345 | 475 |
| 2 | 38.6 | 40.0 | {Limestone, 4.4; Anhydrous sodium sulfate, 1.0} | 16 | 5,180 | 5 | 77–95 | 15 | 44 | 93 | 231 | 312 | 452 |
| | | | | | | 10 | 45–55 | 23 | 78 | 121 | 242 | 345 | 490 |
| | | | | | | 20 | 31–45 | 52 | 92 | 149 | 260 | 342 | 510 |
| | | | | | | 30 | 21–29 | 55 | 101 | 152 | 260 | 350 | 512 |

NOTE: For test temperature of 30° C., 0.5% of citric acid was added to cement as retarder.

What is claimed:

1. A process for manufacturing a modified portland cement which rapidly hardens at low temperatures, which comprises:

mixing at least one carbonate selected from the group consisting of calcium carbonate, sodium carbonate, potassium carbonate and magnesium carbonate with a clinker which mainly consists of a calcium halo-aluminate having the formula: $11CaO \cdot 7Al_2O_3 \cdot CaX_2$ in which X is a halogen and at least one mineral selected from the group consisting of $3CaO \cdot SiO_2$, $2CaO \cdot SiO_2$ and $4CaO \cdot Al_2O_3 \cdot Fe_2O_3$;

intergrinding the mixture; and then mixing finely powdered anhydrite with the ground mixture to manufacture cement in an amount such that the weight ratio of $Al_2O_3 / SO_3$ in the cement is $0.6 - 1.8$.

2. A process claimed in claim 1, wherein the clinker comprises 5–60 percent by weight of $11CaO \cdot 7Al_2O_3 \cdot CaX_2$.

3. A process claimed in claim 1, wherein the fineness of the interground mixture of the clinker and the carbonate is 2,500–8,500 cm$^2$/g Blaine specific surface area.

4. A process claimed in claim 3, wherein the fineness of the interground mixture is 4,000–6,500 cm$^2$/g Blaine specific surface area.

5. A process claimed in claim 1, wherein the carbonate is mixed with the clinker in the amount of 1–15 percent.

6. A process claimed in claim 1, wherein the fineness of anhydrite powder is 2,500–15,000 cm/g Blaine specific surface area.

7. A process claimed in claim 6, wherein the fineness of anhydrite powder is 5,000–10,000 cm$^2$/g Blaine specific surface area.

8. A process claimed in claim 1, wherein the fineness of anhydrite powder mixed with the interground mixture is lowered as the fineness of the interground mixture is decreased.

9. A process claimed in claim 1, wherein X is fluorine.

10. A process claimed in claim 1, wherein at least one sulfate selected from the group consisting of sodium sulfate, potassium sulfate, aluminium sulfate and magnesium sulfate is mixed besides the carbonate.

11. A process claimed in claim 10, wherein the clinker comprises 5–60 percent by weight of $11CaO \cdot 7Al_2O_3 \cdot CaX_2$.

12. A process claimed in claim 10, wherein the sulfate is mixed with the clinker in the amount of 0.1–7.0 percent.

13. A process claimed in claim 10, wherein the fineness of anhydrite is 2,500–15,000 cm$^2$/g Blaine specific surface area.

14. A process claimed in claim 10, wherein the fineness of anhydrite added to the interground mixture is lowered as the fineness of the interground mixture is decreased.

15. A process claimed in claim 10, wherein X is fluorine.

* * * * *